United States Patent [19]

Kato et al.

[11] Patent Number: 5,538,549
[45] Date of Patent: Jul. 23, 1996

[54] RECORDING INK HAVING PIGMENT PARTICLES

[75] Inventors: Masahito Kato, Nagoya; Shunichi Higashiyama, Yokkaichi, both of Japan

[73] Assignee: Brother Kogyo Kabushiki Kaisha, Aichi-ken, Japan

[21] Appl. No.: 464,963

[22] Filed: Jun. 5, 1995

[30] Foreign Application Priority Data

Jun. 13, 1994 [JP] Japan ................................. 6-130038

[51] Int. Cl.$^6$ .................................................. C09D 11/02
[52] U.S. Cl. ........................................ 106/20 C; 106/20 D
[58] Field of Search .............................. 106/20 C, 23 C, 106/20 D

[56] References Cited

U.S. PATENT DOCUMENTS

| | | | |
|---|---|---|---|
| 4,164,423 | 8/1979 | Schumacher et al. | 106/472 |
| 4,339,763 | 7/1982 | Kyser et al. | 346/140 R |
| 4,597,794 | 7/1986 | Ohta et al. | 106/20 D |
| 5,159,349 | 10/1992 | Endo et al. | 346/140 R |
| 5,160,370 | 11/1992 | Suga et al. | 106/20 R |
| 5,229,786 | 7/1993 | Suga et al. | 346/1.1 |
| 5,288,160 | 2/1994 | Li et al. | 106/20 C |
| 5,376,169 | 12/1994 | Hotomi et al. | 106/20 C |
| 5,407,474 | 4/1995 | Airey et al. | 106/20 C |
| 5,417,747 | 5/1995 | Arata et al. | 106/20 C |
| 5,439,514 | 8/1995 | Kashiwazaki et al. | 106/20 C |
| 5,443,628 | 8/1995 | Loria et al. | 106/20 C |

FOREIGN PATENT DOCUMENTS

| | | |
|---|---|---|
| 57-10660 | 1/1982 | Japan . |
| 57-10661 | 1/1982 | Japan . |
| 63-51485 | 3/1988 | Japan . |
| 63-56575 | 3/1988 | Japan . |
| 1-198671 | 8/1989 | Japan . |
| 2-276876 | 11/1990 | Japan . |
| 5-202324 | 8/1993 | Japan . |

*Primary Examiner*—Helene Klemanski
*Attorney, Agent, or Firm*—Oliff & Berridge

[57] ABSTRACT

A recording ink including a pigment as a coloring agent, and a solvent which contains at least water. The pigment consists of particles that are dispersed in the solvent, and has an average particle size of 0.05–0.1 μm. Substantially all of the particles of the pigment have particle sizes in a range of 0.01–0.3 μm.

11 Claims, No Drawings

RECORDING INK HAVING PIGMENT PARTICLES

BACKGROUND OF THE INVENTION

1. Field of the Invention

The present invention relates to a recording ink which includes pigment particles as a coloring agent, which are dispersed in a solvent containing at least water.

2. Discussion of Related Art

Conventionally, an aqueous dye ink composition is widely used as a recording ink for use in an ink jet printing method. This ink composition includes various kinds of water-soluble dyes, which are dissolved in water or a mixture of water and a water-soluble solvent, and various additives as needed, as disclosed in JP-A-63-51485, JP-A-63-56575, and JP-A-1-198671, for example. However, the aqueous dye ink composition, when actually used for printing images on a recording medium, exhibits insufficient water-fastness and light-fastness of the printed images, thus leaving some room for improvements.

In view of the above, there has been developed in recent years a pigment ink composition which contains a pigment or pigments, such as carbon black or Diazo Yellow, in place of the dyes as described above, and thus exhibits improved water-fastness and light-fastness of printed images. The pigment ink composition may be suitably used in an ink jet printing method, as disclosed in JP-A-57-10660, JP-A-57-10661, U.S. Pat. Nos. 4,597,794, 5,160,370, 5,229;786 and JP-A-2-276876, for example. The pigment ink exhibits higher water-fastness than the dye ink, since the pigment sticks or adheres to a recording medium, such as paper, due to the use of resin in the ink composition. Further, pigments are less sensitive to light than dyes, and, therefore, the pigment ink exhibits higher light-fastness than the dye ink.

However, the pigment ink is likely to undergo chronological changes, resulting in reduced stability, since the ink contains pigment particles which are not dissolved in an ink solvent. To solve this problem, JP-A-5-202324 has proposed to use a non-aqueous solvent, and control the average particle size of the pigment to the range of 1.0 μm to 2.0 μm, so as to improve the chronological stability of the ink, and print quality of recorded images. The print quality may be evaluated in terms of blurring and print density, for example.

Generally, the viscosity of the ink used for the ink jet printing is controlled to a desirable range of several centipoises. When the pigment having such viscosity have an average particle size in the above range of 1.0 to 2.0 μm, however, the pigment particles have increased sedimentation velocity, according to Stokes' law, resulting in reduced chronological stability of the ink. Although the stability may be improved by increasing an amount of a dispersing agent added to the ink composition, this in turn increases the viscosity of the ink, and thus requires high energy input in order to eject the ink from a nozzle of a printhead of an ink jet printer. This eventually pushes up the costs of a power source for supplying the ink jetting energy or power, and a driving circuit for controlling the energy.

SUMMARY OF THE INVENTION

It is therefore an object of the present invention to provide a recording ink which has a relatively low viscosity and exhibits sufficiently high chronological stability.

The above object may be accomplished according to the principle of the present invention, which provides a recording ink including a pigment as a coloring agent, and a solvent containing at least water, the pigment consisting of particles that are dispersed in the solvent, and having an average particle size of 0.05–0.1 μm, substantially all of the particles of the pigment having particle sizes in a range of 0.01–0.3 μm.

The recording ink as described above has a relatively low viscosity, and exhibits sufficiently high chronological stability. Further, the ink is free from blurring and provides high print density. Moreover, the present recording ink enables printed images to be stored for a long period of time, assuring high print quality, due to excellent light-fastness and water-fastness of the pigment.

Preferably, substantially all of the particles of the pigment have diameters in a range of 0.01–0.2 μm.

The recording ink as described above may be advantageously used in an ink jet device for jetting the ink from a nozzle formed through the device, so as to effect printing on a recording medium. In this case, the ink jet device is capable of effect printing with high stability, without suffering from clogging of the nozzle, to produce high-quality print images. Further, high energy input is not required in order to eject the ink from the nozzle of the ink jet device to effect printing. This eventually reduces the costs of power source for supplying the ink jetting energy or power, and driving circuit for controlling the energy.

DETAILED DESCRIPTION OF THE INVENTION

A recording ink according to one embodiment of the present invention consists principally of a water-based solvent and a pigment, to which a dispersing agent and other additives are added as needed. The pigment serves as a coloring component of the ink. The dispersing agent serves to disperse particles of the pigment in the solvent, and other additives prevent agglomeration or coagulation of the pigment particles, and improve the water-fastness of the ink after printing. The ink has a viscosity of 1–50 centipoises at 25° C., preferably, 1–10 centipoises at 25° C., and more preferably, 2–3 centipoises at 25° C.

The solvent used for the recording ink of the present embodiment is required to have a relatively low viscosity, and be treated or handled with safety and ease. Further the solvent should be available at a low cost, and free from odor. To this end, the solvent is water, or a mixture of water and a water-soluble solvent as indicated below.

The present recording ink is desirably used in an ink jet printer for carrying out a known ink jet recording method. The ink jet printer has a plurality of extremely narrow ink channels which are filled with the ink, and communicate at their ends with respective nozzles. In operation, droplets of the ink present in the ink channels are selectively jetted or ejected from the corresponding nozzles, by instantaneously applying a physical force to the ink channels, so that the ink droplets are deposited on a recording medium, such as paper, to print desired images on the paper. In this ink jet recording method, however, the ink solvent may evaporate while the ink is passing through the nozzles, and the pigment particles may remain in the nozzles and thus clog the nozzles. In this case, the printing operation is interrupted or discontinued. To prevent such clogging of the nozzles, the solvent desirably includes a low-volatile water-soluble solvent as well as water. The water-soluble solvent may be selected from polyhydric alcohols, such as glycerol, ethylene glycol, diethylene glycol, propylene glycol, which have a high boiling point and a low volatility. It is also possible to use a mixture of two or more kinds of the above-indicated low-volatile water-soluble solvents.

The pigment used for the recording ink of the present invention is not particularly limited to any specific materials. For example, a pigment used for production of black-andwhite images may be selected from: carbon blacks, such as furnace black, lamp black, acetylene black, and channel black, metals or their oxides, such as copper, iron, and titanium oxide, and organic pigments such as orthonitroaniline black. Pigments used for production of color images may be selected from: Toluidine Red, Permanent Carmine FB, Fast Yellow AAA, Disazo Orange PMP, Lake Red C, Brilliant Carmine 6B, Phthalocyanine Blue, quinacridone red, Dioxane Violet, Victoria Pure Blue, Alkali Blue Toner, Fast Yellow 10G, Disazo Yellow AAMX, Disazo Yellow AAOT, Disazo Yellow AAOA, yellow iron oxide, Disazo Yellow HR, orthonitroaniline orange, Dinitroaniline Orange, Vulcan Orange, Toluidine Red, chlorinated Para Red, Brilliant First Scarlet, Naphthol Red 23, Pyrazolone Red, barium red 2B, calcium red 2B, strontium red 2B, manganese red 2B, Barium Lithol Red, Pigment Scarlet 3B Lake, Lake Bordeaux 10B, Ansosine 3B Lake, Ansosine 5B Lake, Rhodamine 6G Lake, eosine lake, red iron oxide, Faphtol Red FGR, Rhodamine B Lake, Methyl Violet Lake, dioxazine violet, Basic Blue 5B Lake, Basic Blue 6G Lake, Fast Sky Blue, Alkali Blue R Toner, Peacock Blue Lake, prussian blue, ultramarine, Reflex Blue 2G, Reflex Blue R, Brilliant Green Lake, Diamond Green Thioflavine Lake, Phthalocyanine Green G, Green Gold, Phthalocyanine Green Y, iron oxide powder, rust powder, zinc flower, titanium oxide, calcium carbonate, clay, barium sulfate, alumina, alumina white, aluminum powder, bronze powder, daylight fluorescent pigment, pearl pigment, Naphthol Carmine FB, Naphthol Red M, Permanent Carmine FB, Fast Yellow G, Disazo Yellow AAA, Dioxan Violet, Alkali Blue G Toner, and others, and processed pigments, such as graft carbon, which are coated with a resin, for example.

The dispersing agent may be selected from anionic surface active agents, cationic surface active agents, amphoteric surface active agents, nonionic surface active agents, high molecular surface active agents, and high molecular compounds, for example.

The anionic surface active agents include alkylsulfate and polyoxyethylene alkyl ether sulfate, for example.

The cationic surface active agents include alkyltrimethylammonium chloride and dialkyldimethylammonium chloride, for example.

The amphoteric surface active agents include alkyl dimethyl aminoacetate betain, alkyl dimethyl amine oxide, and alkyl carboxymethyl hydroxyethyl imidazolium betain, for example.

The nonionic surface active agents include polyoxyethylene sorbitan fatty acid ester, polyoxyethylene alkyl ether, polyoxyethylene alkyl phenyl ether, polyoxyethylene, polyoxypropylene glycol, and polyoxypropylene alkyl ether, for example.

The high molecular surface active agents include high molecular weight polyurethane and polyesters, while the high molecular compounds include polymers having a functional group, such as a carbonyl group or amino group, which has a strong affinity for the pigment.

A water-soluble resin may be used as the dispersing agent. For example, the resin is selected from cellulose resin, acrylic resin, silicone resin, vinyl resin and others. The water-soluble resin may also be added as a fixing agent for fixing the pigment to a recording medium.

The recording ink according to the present invention contains 3–20% by weight, preferably, 5–15% by weight of the above-indicated pigment(s), 1–15% by weight, preferably, 2–10% by weight of the dispersing agent, and 1–10% by weight, preferably, 2–5% by weight of the resin.

The recording ink of the present invention may further include a pH adjuster as needed, which may be selected from alkali metal hydroxides, such as sodium hydroxide, potassium hydroxide, and lithium hydroxide, lower alkanol amines, such as ethanolamine, diethanolamine, triethanolamine, and propanolamine, and ammonium hydroxide and potassium dihydrogenphosphate, for example.

The ink may further include a phenolic compound or sodium benzoate, to prevent corrosion or molding of the ink, or may include ethylenediamine tetraacetic acid (EDTA), for example, to prevent rusting of the ink.

It is to be understood that the solvent, pigment, dispersing agent and other additives used in the recording ink of the present invention are by no means limited to those as indicated above.

There will be hereinafter described some examples of the recording ink according to the present invention, and some comparative examples.

The recording ink of Example 1 as indicated in TABLE 1 was produced in the following manner. Initially, a dispersing agent: BYK-154 available from BYK-Chemie GmbH, Germany, and a resin: polyvinyl alcohol (B03) available from Denki Kagaku Kogyo Kabushiki Kaisha, Japan, were dissolved in a solvent consisting of water and glycerol. Then, a pigment, PRINTEX 90 available from Degussa Japan Co., Ltd., Japan, was added to the solution, and dispersed in a beads mill. In this manner, the recording ink of Example 1 was produced. The other examples, that is, Examples 2–24 and Comparative Examples 1–24, were produced in similar manners. However, the method of producing a recording ink is not limited to that as described above.

TABLE 1 through TABLE 6 indicate respective ink compositions of Examples 1–24 and Comparative Examples 1–24, a diameter of beads of the beads mill in which the pigment particles of each example were dispersed, a residence time which is a time duration in which the ink resided or stayed in a vessel of the beads mill for dispersion of the pigment particles, and the average particle size and the maximum and minimum particle sizes or diameters of the pigment particles of each example. The maximum and minimum particle sizes indicate an actual range of particle size distribution. The particle size distribution of the pigment was measured with a suitable particle size distribution meter, and also observed with a microscope. The viscosity of the inks of Examples 1–24 and Comparative Examples 1–24 was in the range of 2–3 centipoises, which range is suitable for recording inks to be used in an ink jet printing method.

TABLE I

| Ink composition (wt %) | Example | | | | Comparative Example | | | |
| --- | --- | --- | --- | --- | --- | --- | --- | --- |
| | 1 | 2 | 3 | 4 | 1 | 2 | 3 | 4 |
| Pigment | | | | | | | | |
| PRINTEX 90 *1 | 5.0 | 5.0 | 5.0 | 5.0 | 5.0 | 5.0 | 5.0 | 5.0 |

TABLE 1-continued

| Ink composition (wt %) | Example | | | | Comparative Example | | | |
|---|---|---|---|---|---|---|---|---|
| | 1 | 2 | 3 | 4 | 1 | 2 | 3 | 4 |
| Dispersing agent | | | | | | | | |
| BYK-154 *2 | 5.0 | 5.0 | | | 5.0 | 5.0 | | |
| Disperbyk *3 | | | 5.0 | 5.0 | | | 5.0 | 5.0 |
| Resin | | | | | | | | |
| polyvinyl alcohol *4 | 1.0 | 1.0 | 1.0 | 1.0 | 1.0 | 1.0 | 1.0 | 1.0 |
| Solvent | | | | | | | | |
| pure water | 79.0 | 79.0 | 79.0 | 79.0 | 79.0 | 79.0 | 79.0 | 79.0 |
| glycerol *5 | 10.0 | 10.0 | 10.0 | 10.0 | 10.0 | 10.0 | 10.0 | 10.0 |
| Beads diameter (mm) | 0.3 | 0.3 | 0.3 | 0.3 | 0.3 | 0.3 | 0.3 | 0.3 |
| Residence time (sec.) | 2450 | 3109 | 3110 | 2230 | 20102 | 2120 | 21034 | 1982 |
| Average particle size (μm) | 0.085 | 0.073 | 0.077 | 0.095 | 0.028 | 0.135 | 0.033 | 0.151 |
| Maximum particle size (μm) | 0.150 | 0.126 | 0.134 | 0.242 | 0.079 | 0.412 | 0.082 | 0.423 |
| Mimimum particle size (μm) | 0.022 | 0.020 | 0.021 | 0.022 | 0.008 | 0.045 | 0.011 | 0.048 |

*1 available from Degussa Japan Co., Ltd., Japan
*2, *3 available from BYK-Chemie GmbH, Germany
*4 available from Denki Kagaku Kogyo Kabushiki Kaisha, Japan
*5 available from Kanto Chemical Co., Ltd., Japan

TABLE 2

| Ink composition (wt %) | Example | | | | Comparative Example | | | |
|---|---|---|---|---|---|---|---|---|
| | 5 | 6 | 7 | 8 | 5 | 6 | 7 | 8 |
| Pigment | | | | | | | | |
| PRINTEX 90 | 5.0 | 5.0 | 5.0 | 5.0 | 5.0 | 5.0 | 5.0 | 5.0 |
| Dispersing agent | | | | | | | | |
| BYK-154 | 5.0 | 5.0 | | | 5.0 | 5.0 | | |
| Disperbyk | | | 5.0 | 5.0 | | | 5.0 | 5.0 |
| Resin | | | | | | | | |
| polyvinyl alcohol | 1.0 | 1.0 | 1.0 | 1.0 | 1.0 | 1.0 | 1.0 | 1.0 |
| Solvent | | | | | | | | |
| pure water | 79.0 | 79.0 | 79.0 | 79.0 | 79.0 | 79.0 | 79.0 | 79.0 |
| glycerol | 10.0 | 10.0 | 10.0 | 10.0 | 10.0 | 10.0 | 10.0 | 10.0 |
| Beads diameter (mm) | 0.3 | 0.3 | 0.3 | 0.3 | 0.3 | 0.3 | 0.3 | 0.3 |
| Residence time (sec.) | 3209 | 3312 | 2890 | 2922 | 3507 | 2198 | 2171 | 19708 |
| Average particle size (μm) | 0.066 | 0.053 | 0.088 | 0.083 | 0.041 | 0.108 | 0.097 | 0.051 |
| Maximum particle size (μm) | 0.122 | 0.106 | 0.186 | 0.175 | 0.095 | 0.276 | 0.311 | 0.112 |
| Mimimum particle size (μm) | 0.021 | 0.016 | 0.021 | 0.022 | 0.011 | 0.025 | 0.024 | 0.009 |

TABLE 3

| Ink composition (wt %) | Example | | | | Comparative Example | | | |
|---|---|---|---|---|---|---|---|---|
| | 9 | 10 | 11 | 12 | 9 | 10 | 11 | 12 |
| Pigment | | | | | | | | |
| #960 *6 | 5.0 | 5.0 | 5.0 | 5.0 | 5.0 | 5.0 | 5.0 | 5.0 |
| Dispersing agent | | | | | | | | |
| BYK-154 | 5.0 | 5.0 | | | 5.0 | 5.0 | | |
| Disperbyk | | | 5.0 | 5.0 | | | 5.0 | 5.0 |
| Resin | | | | | | | | |
| polyvinyl alcohol | 1.0 | 1.0 | 1.0 | 1.0 | 1.0 | 1.0 | 1.0 | 1.0 |

TABLE 3-continued

| Ink composition (wt %) | Example | | | | Comparative Example | | | |
| --- | --- | --- | --- | --- | --- | --- | --- | --- |
| | 9 | 10 | 11 | 12 | 9 | 10 | 11 | 12 |
| Solvent | | | | | | | | |
| pure water | 79.0 | 79.0 | 79.0 | 79.0 | 79.0 | 79.0 | 79.0 | 79.0 |
| glycerol | 10.0 | 10.0 | 10.0 | 10.0 | 10.0 | 10.0 | 10.0 | 10.0 |
| Beads diameter (mm) | 0.3 | 0.3 | 0.3 | 0.3 | 0.3 | 1.0 | 0.3 | 1.0 |
| Residence time (sec.) | 2501 | 2622 | 3214 | 2225 | 1673 | 2096 | 1288 | 2005 |
| Average particle size (μm) | 0.080 | 0.071 | 0.059 | 0.095 | 0.109 | 0.132 | 0.138 | 0.146 |
| Maximum particle size (μm) | 0.142 | 0.121 | 0.103 | 0.262 | 0.296 | 0.398 | 0.397 | 0.405 |
| Mimimum particle size (μm) | 0.020 | 0.019 | 0.020 | 0.021 | 0.039 | 0.044 | 0.052 | 0.048 |

*6 available from Mitsubishi Kasei Corporation, Japan

TABLE 4

| Ink composition (wt %) | Example | | | | Comparative Example | | | |
| --- | --- | --- | --- | --- | --- | --- | --- | --- |
| | 13 | 14 | 15 | 16 | 13 | 14 | 15 | 16 |
| Pigment | | | | | | | | |
| KETRED309 *7 | 5.0 | 5.0 | 5.0 | 5.0 | 5.0 | 5.0 | 5.0 | 5.0 |
| Dispersing agent | | | | | | | | |
| BYK-154 | 5.0 | 5.0 | | | 5.0 | 5.0 | | |
| Disperbyk | | | 5.0 | 5.0 | | | 5.0 | 5.0 |
| Resin | | | | | | | | |
| polyvinyl alcohol | 1.0 | 1.0 | 1.0 | 1.0 | 1.0 | 1.0 | 1.0 | 1.0 |
| Solvent | | | | | | | | |
| pure water | 79.0 | 79.0 | 79.0 | 79.0 | 79.0 | 79.0 | 79.0 | 79.0 |
| glycerol | 10.0 | 10.0 | 10.0 | 10.0 | 10.0 | 10.0 | 10.0 | 10.0 |
| Beads diameter (mm) | 0.3 | 0.3 | 0.3 | 0.3 | 0.3 | 1.0 | 0.3 | 1.0 |
| Residence time (sec.) | 2638 | 3609 | 2565 | 3350 | 2211 | 2112 | 1298 | 1982 |
| Average particle size (μm) | 0.082 | 0.072 | 0.090 | 0.076 | 0.117 | 0.143 | 0.142 | 0.163 |
| Maximum particle size (μm) | 0.162 | 0.137 | 0.168 | 0.139 | 0.488 | 0.589 | 0.579 | 0.601 |
| Mimimum particle size (μm) | 0.025 | 0.022 | 0.021 | 0.021 | 0.067 | 0.072 | 0.073 | 0.071 |

*7 available from Dainippon Ink & Chemicals Inc., Japan

TABLE 5

| Ink composition (wt %) | Example | | | | Comparative Example | | | |
| --- | --- | --- | --- | --- | --- | --- | --- | --- |
| | 17 | 18 | 19 | 20 | 17 | 18 | 19 | 20 |
| Pigment | | | | | | | | |
| KETYELLOW 403 *8 | 5.0 | 5.0 | 5.0 | 5.0 | 5.0 | 5.0 | 5.0 | 5.0 |
| Dispersing agent | | | | | | | | |
| BYK-154 | 5.0 | 5.0 | | | 5.0 | 5.0 | | |
| Disperbyk | | | 5.0 | 5.0 | | | 5.0 | 5.0 |
| Resin | | | | | | | | |
| polyvinyl alcohol | 1.0 | 1.0 | 1.0 | 1.0 | 1.0 | 1.0 | 1.0 | 1.0 |
| Solvent | | | | | | | | |
| pure water | 79.0 | 79.0 | 79.0 | 79.0 | 79.0 | 79.0 | 79.0 | 79.0 |
| glycerol | 10.0 | 10.0 | 10.0 | 10.0 | 10.0 | 10.0 | 10.0 | 10.0 |
| Beads diameter (mm) | 0.3 | 0.3 | 0.3 | 0.3 | 0.3 | 1.0 | 0.3 | 1.0 |
| Residence time (sec.) | 2599 | 3621 | 2547 | 3243 | 1345 | 2132 | 1310 | 2001 |
| Average particle size (μm) | 0.081 | 0.069 | 0.089 | 0.080 | 0.131 | 0.143 | 0.141 | 0.165 |
| Maximum particle size (μm) | 0.170 | 0.136 | 0.165 | 0.148 | 0.510 | 0.583 | 0.579 | 0.598 |
| Mimimum particle size (μm) | 0.029 | 0.023 | 0.023 | 0.022 | 0.073 | 0.071 | 0.072 | 0.069 |

*8 available from Dainippon Ink & Chemicals Inc.

TABLE 6

| Ink composition (wt %) | Example | | | | Comparative Example | | | |
|---|---|---|---|---|---|---|---|---|
| | 21 | 22 | 23 | 24 | 21 | 22 | 23 | 24 |
| Pigment | | | | | | | | |
| KETBLUEEx-1 *9 | 5.0 | 5.0 | 5.0 | 5.0 | 5.0 | 5.0 | 5.0 | 5.0 |
| Dispersing agent | | | | | | | | |
| BYK-154 | 5.0 | 5.0 | | | 5.0 | 5.0 | | |
| Disperbyk | | | 5.0 | 5.0 | | | 5.0 | 5.0 |
| Resin | | | | | | | | |
| polyvinyl alcohol | 1.0 | 1.0 | 1.0 | 1.0 | 1.0 | 1.0 | 1.0 | 1.0 |
| Solvent | | | | | | | | |
| pure water | 79.0 | 79.0 | 79.0 | 79.0 | 79.0 | 79.0 | 79.0 | 79.0 |
| glycerol | 10.0 | 10.0 | 10.0 | 10.0 | 10.0 | 10.0 | 10.0 | 10.0 |
| Beads diameter (mm) | 0.3 | 0.3 | 0.3 | 0.3 | 0.3 | 1.0 | 0.3 | 1.0 |
| Residence time (sec.) | 2401 | 3110 | 2407 | 3090 | 1332 | 2221 | 1301 | 2116 |
| Average particle size (μm) | 0.081 | 0.071 | 0.088 | 0.077 | 0.125 | 0.137 | 0.136 | 0.145 |
| Maximum particle size (μm) | 0.147 | 0.131 | 0.159 | 0.135 | 0.334 | 0.401 | 0.389 | 0.406 |
| Mimimum particle size (μm) | 0.023 | 0.022 | 0.022 | 0.021 | 0.056 | 0.045 | 0.049 | 0.050 |

*9 available from Dainippon Ink & Chemicals Inc.

Each of the recording inks according to Examples 1–24 and Comparative Examples 1–24 was evaluated in the following manners, in terms of its chronological stability, and blurring and print density of images printed by the ink.

The ink chronological stability was evaluated by observing an ink according to the following criteria, after the ink was fluid-tightly kept in a container for 100 days at a high temperature of 60° C. In TABLES 7–9, "O" (excellent) indicates that no change was found in the ink, and "OΔ" (acceptable) indicates that some change was found, but it did not cause any problem, while "Δ" (unacceptable) indicates that sedimentation of pigment particles of the ink was found, but no agglomeration of the pigment particles was found, and "X" (poor) indicates that sedimentation and agglomeration of the pigment particles were found.

To determine blurring of printed images with respect to each example, a droplet of an ink was dropped on a copy sheet (L type paper available from FUJI XEROX KABUSHIKI KAISHA, Japan), by means of an injector, and a spot made by the ink on the paper was visually observed. In TABLES 7–9, "O" indicates that no blurring of the ink was found, and "X" indicates that blurring was recognized.

To determine the print density with respect to each example, a copy sheet (L type paper available from FUJI XEROX KABUSHIKI KAISHA) was coated with an ink, with a density of 1.5 mg/cm$^2$, and left as it is for one day. Then, the print density was measured by means of Macbeth densitometer RD-914. Generally, the print density is considered to be insufficient, that is, printed images are not sufficiently clear, when the density level is smaller than 1.2.

The results of the evaluation as described above are indicated in TABLE 7 through TABLE 9 below.

TABLE 7

| | Example | | | | | | | | Comparative Example | | | | | | | |
|---|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 | 8 |
| Chronological stability | O | O | O | OΔ | O | O | O | O | O | X | O | X | O | Δ | X | O |
| Blurring | O | O | O | O | O | O | O | O | X | O | X | O | X | O | O | X |
| Print density | 1.29 | 1.25 | 1.26 | 1.30 | 1.27 | 1.23 | 1.25 | 1.29 | 1.08 | 1.32 | 1.09 | 1.33 | 1.09 | 1.28 | 1.28 | 1.07 |

TABLE 8

| | Example | | | | | | | | Comparative Example | | | | | | | |
|---|---|---|---|---|---|---|---|---|---|---|---|---|---|---|---|---|
| | 9 | 10 | 11 | 12 | 13 | 14 | 15 | 16 | 9 | 10 | 11 | 12 | 13 | 14 | 15 | 16 |
| Chronological stability | O | O | O | OΔ | O | O | O | O | Δ | Δ | X | X | Δ | X | X | X |
| Blurring | O | O | O | O | O | O | O | O | O | O | O | O | O | O | O | O |
| Print density | 1.27 | 1.23 | 1.25 | 1.30 | 1.28 | 1.25 | 1.31 | 1.27 | 1.26 | 1.27 | 1.33 | 1.35 | 1.32 | 1.34 | 1.33 | 1.36 |

TABLE 9

| | Example | | | | | | | | Comparative Example | | | | | | | |
|---|---|---|---|---|---|---|---|---|---|---|---|---|---|---|---|---|
| | 17 | 18 | 19 | 20 | 21 | 22 | 23 | 24 | 17 | 18 | 19 | 20 | 21 | 22 | 23 | 24 |
| Chronological stability | ◯ | ◯ | ◯ | ◯ | ◯ | ◯ | ◯ | ◯ | Δ | X | X | X | Δ | X | X | X |
| Blurring | ◯ | ◯ | ◯ | ◯ | ◯ | ◯ | ◯ | ◯ | ◯ | ◯ | ◯ | ◯ | ◯ | ◯ | ◯ | ◯ |
| Print density | 1.27 | 1.24 | 1.31 | 1.28 | 1.26 | 1.23 | 1.27 | 1.25 | 1.32 | 1.33 | 1.33 | 1.35 | 1.32 | 1.35 | 1.35 | 1.36 |

In Examples 1–12 and Comparative Examples 1–12, carbon black was used as the pigment, as indicated in TABLE 1 through TABLE 3. The results of evaluation of these inks are indicated in TABLES 7 and 8. It will be understood from the results that the chronological stability of the inks of Examples 1–12 was excellent or acceptable, and that these inks were free from blurring and provided a print density of higher than 1.2. It is noted that the average particle size of the pigment of each of Examples 1–12 was in the range of 0.053 to 0.095 μm, and the particle sizes or diameters of all the pigment particles of each example were in the range of 0.016 to 0.262 μm. In Examples 1–3 and 5–11, in particular, the maximum particle size of the pigment particles was less than 0.2 μm, and the inks exhibited excellent chronological stability.

In Comparative Examples 1, 3, 5 and 8, the inks blurred, and the print density was less than 1.2. In Comparative Examples 1, 3 and 5, the average particle size of the pigments was in the range of 0.028 to 0.041 μm, and a greater number of relatively small pigment particles were present in the inks, as compared with Examples 1–12. The average particle size of the pigment of Comparative Example 8 was 0.052 μm, which is substantially equal to that of Example 6. However, the minimum particle size of the pigment of Comparative Example 8, i.e., 0.009 μm, was smaller than that of Example 6, i.e., 0.016 μm. It will be understood that the ink of Comparative Example 8 suffered from blurring, and exhibited undesirably low print density, due to the smaller minimum particle size of the pigment.

In the other comparative examples, no blurring was found, and the print density was higher than 1.2. However, the pigment particles of these examples underwent a high rate of sedimentation, resulting in reduced chronological stability of the inks. In Comparative Examples 2, 4, 6 and 9–12, the average particle size of the pigments was in the range of 0.108 to 0.151 μm, and a greater number of relatively large pigment particles were present in the inks, as compared with Examples 1–12. The average particle size of the pigment of Comparative Example 7 was 0.097 μm, which is substantially equal to that of Example 12. However, the maximum particle size of the pigment of Comparative Example 7, i.e., 0.311 μm, was greater than that of Example 12, i.e., 0.262 μm. It will be understood that sedimentation of the pigment particles of Comparative Example 7 occurred due to the greater maximum particle size of the pigment.

In Examples 13–24 and Comparative Examples 13–24, three kinds of color pigments, that is, KETRED 309, KETYELLOW 403 and KETBLUE Ex-1, available from Dainippon Ink & Chemicals Inc., Japan, were used as indicated in TABLE 4 through TABLE 6. The results of evaluation of these inks are indicated in TABLES 8 and 9. It will be understood from the results that the chronological stability of the inks of Examples 13–24 was excellent, and that these inks were free from blurring and provided a print density of higher than 1.2. It is noted that the average particle size of the pigment of each of Examples 13–24 was in the range of 0.071 to 0.090 μm, and the particle sizes or diameters of all the pigment particles of each example were in the range of 0.021 to 0.170 μm.

In Comparative Examples 13–24, no blurring of the inks was found, and the print density was higher than 1.2. However, the pigment particles of these examples underwent a high rate of sedimentation, resulting in reduced chronological stability of the inks. In Comparative Examples 13–24, the average particle size of the pigments was in the range of 0.117 to 0.165 μm, and a greater number of relatively large pigment particles were present in the ink, as compared with Examples 13–24.

In Examples 1–24 of the present invention, which exhibited excellent characteristics as described above, the particle sizes of all of the pigment particles were in the range of 0.01 to 0.3 μm. TABLE 10 indicates the percentage of the pigment particles whose particle sizes were in the range of 0.01 to 0.3 μm, with respect to each ink of Examples 1–24 and Comparative Examples 1–24.

TABLE 10

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Percentage (%) | 100 | 100 | 100 | 100 | 100 | 100 | 100 | 100 | 100 | 100 | 100 | 100 |

| | Example | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| Percentage (%) | 100 | 100 | 100 | 100 | 100 | 100 | 100 | 100 | 100 | 100 | 100 | 100 |

TABLE 10-continued

| | Comparative Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Percentage (%) | 98.9 | 98.7 | 100 | 98.5 | 100 | 100 | 99.2 | 99.3 | 100 | 98.4 | 98.3 | 98.0 |

| | Comparative Example | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| Percentage (%) | 97.8 | 96.9 | 97.1 | 96.8 | 97.7 | 96.7 | 97.2 | 96.8 | 98.9 | 98.6 | 98.8 | 98.7 |

As described above, the particle sizes of all the pigment particles of the inks according to Examples 1–24 were in the range of 0.01–0.3 μm. Although the particle sizes of all the pigment particles of Comparative Examples 3 and 5 were also in the same range of 0.01–0.3 μm, the average particle sizes of the pigments of these examples were smaller than those of Examples 1–24, that is, the pigment particles as a whole were relatively small, whereby blurring of the inks was found as indicated in TABLE 7. Similarly, the particle sizes of all the pigment particles of Comparative Examples 6 and 9 were in the above range of 0.01–0.3 μm. However, the average particle sizes of the pigments of these examples were larger than those of Examples 1–24, as indicated in TABLES 2 and 3, whereby the inks of Comparative Examples 6 and 9 exhibited poor chronological stability, as indicated in TABLE 7. In the other comparative examples, 96.7–99.3% of the pigment particles had particle sizes in the range of 0.01–0.3 μm. Thus, these inks suffered from any one of poor chronological stability, blurring and low print density.

In Examples 1–24 which exhibited excellent characteristics as described above, the average particle size of the pigment of each ink was in the range of 0.05–0.1 μm, and the particle sizes of all the pigment particles were distributed in the range of 0.01–0.3 μm. On the other hand, in some comparative examples, the average particle size of the pigment particles was outside the range of 0.05– 0.1 μm, and, in other comparative examples, the ink included pigment particles whose particle sizes were outside the range of 0.01–0.3 μm.

Another example of an ink was produced such that the average particle size of its pigment particles was in the range of 0.05–0.1 μm, and about 0.5% of the pigment particles had particle sizes that were outside the range of 0.01–0.3 μm but not greater than 0.5 μm. This ink exhibited good chronological stability, no blurring and sufficiently high print density.

It will be understood from the above description that a recording ink exhibits excellent chronological stability and provides high print quality and density, when the average particle size of pigment particles of the ink is in the range of 0.05–0.1 μm, and the particle sizes of almost all the pigment particles are in the range of 0.01–0.3 μm. When this recording ink was used in an ink jet printhead having shear mode actuators, as disclosed in U.S. Pat. No. 5,016,028, to effect ink jet printing, the ink was stably jetted or ejected from the printhead, without causing clogging of nozzles of the printhead, and rapidly dried after the printing, assuring good print quality (no blurring) and high print density. The ink was also excellent in terms of the chronological stability, water fastness, resistance to abrasion, and finger touch. Since the recording ink as described above generally has a viscosity of 2–3, centipoises, high energy input is not required in order to eject the ink from the nozzles of the printhead to effect printing. This eventually reduces the costs of power source for supplying the ink jetting energy or power, and driving circuit for controlling the energy.

Similar effects were obtained when the recording ink as described above was used in other types of ink jet printheads, such as a Kyser type as disclosed in U.S. Pat. No. 4,339,763, or a thermal jet type as disclosed in U.S. Pat. No. 5,159,349.

While the beads mill was used to produce the inks of Examples 1–24 and Comparative Examples 1–24, ball mill, sand mill, attrition mill, roller mill, agitator, Henshel type mixer, colloid mill, ultrasonic homogenizer, extra-high-voltage homogenizer, or pearl mill, for example, may be used for dispersing the pigment.

Further, the viscosity of the recording ink according to the present invention is not limited to 2–3 centipoises, but may be several centipoises. In this case, too, the ink can be stably jetted or ejected from the ink jet printhead.

What is claimed is:

1. A recording ink including a pigment as a coloring agent, and a solvent containing at least water, said pigment consisting of particles dispersed in said solvent and having an average particle size of 0.05–0.1 μm, substantially all of said particles of said pigment having particle sizes in a range of 0.01–0.3 μm.

2. A recording ink according to claim 1, wherein substantially all of said particles of said pigment have diameters in a range of 0.01–0.2 μm.

3. A recording ink according to claim 1, which is used in an ink jet device for jetting the ink from a nozzle formed through the device, so as to effect printing on a recording medium.

4. A recording ink according to claim 1, which has a viscosity of 1–50 centipoises at 25° C.

5. A recording ink according to claim 4, wherein said viscosity is in a range of 1–10 centipoises at 25° C.

6. A recording ink according to claim 5, wherein said viscosity is in a range of 2–3 centipoises at 25° C.

7. A recording ink according to claim 1, wherein said solvent further contains a low-volatile water-soluble solvent.

8. A recording ink according to claim 7, wherein said low-volatile water-soluble solvent is selected from polyhydric alcohols.

9. A recording ink according to claim 1, wherein said pigment is contained in an amount of 3–20% by weight.

10. A recording ink according to claim 1, further including 1–15% by weight of a dispersing agent.

11. A recording ink according to claim 1, further including 1–10% by weight of a resin.

* * * * *